United States Patent [19]
Ikebe et al.

[11] Patent Number: 5,498,456
[45] Date of Patent: * Mar. 12, 1996

[54] DISC CARTRIDGE

[75] Inventors: Masaru Ikebe, Saku; Haruo Shiba, Komoro; Yukio Miyazaki, Saku; Morimasa Sasaki, Saku; Hisao Katoh, Saku, all of Japan

[73] Assignee: TDK Corporation, Tokyo, Japan

[ * ] Notice: The portion of the term of this patent subsequent to Jul. 5, 2011, has been disclaimed.

[21] Appl. No.: 182,854

[22] Filed: Jan. 18, 1994

Related U.S. Application Data

[63] Continuation-in-part of Ser. No. 901,380, Jun. 19, 1992, Pat. No. 5,326,608.

[30] Foreign Application Priority Data

Jun. 21, 1991 [JP] Japan ......................... 3-55227
Feb. 5, 1993 [JP] Japan ..................... 5-042295

[51] Int. Cl.⁶ ................................. G11B 23/033
[52] U.S. Cl. ............... 428/66.6; 428/76; 360/133
[58] Field of Search ................ 428/65, 76; 360/133; 206/444; 369/291

[56] References Cited

U.S. PATENT DOCUMENTS

| | | | |
|---|---|---|---|
| 4,677,517 | 6/1987 | Gelardi et al. | 360/133 |
| 4,682,257 | 7/1987 | Neuman | 360/128 |
| 4,739,433 | 4/1988 | Oishi et al. | 360/133 |
| 5,006,948 | 4/1991 | Fukunaga et al. | 360/133 |
| 5,326,608 | 7/1994 | Ikebe et al. | 428/65 |

FOREIGN PATENT DOCUMENTS 606942  3/1985  Japan .

*Primary Examiner*—Alexander S. Thomas
*Attorney, Agent, or Firm*—Price, Gess, & Ubell

[57] ABSTRACT

An elastic lifter arranged on an inner surface of a casing of a disc cartridge to exert a pressing force on a disc is formed integrally with the casing and into a plate-like shape in such a manner that a proximal end thereof is connected to the casing and a distal end thereof is rendered free. Such construction permits the pressing force to be kept constant for a long period of time and effectively prevents damage to the disc, to thereby substantially improve durability and reliability of the disc cartridge while significantly decreasing the number of parts, facilitating assembling of the disc cartridge, and attains a decrease in manufacturing cost. The lifter may be formed at a proximal end thereof with a decreased thickness, to thereby facilitate bending of the lifter.

19 Claims, 13 Drawing Sheets

F I G. 17A
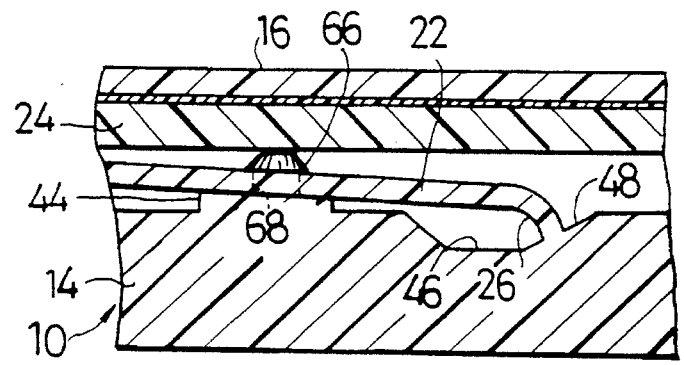
F I G. 17B
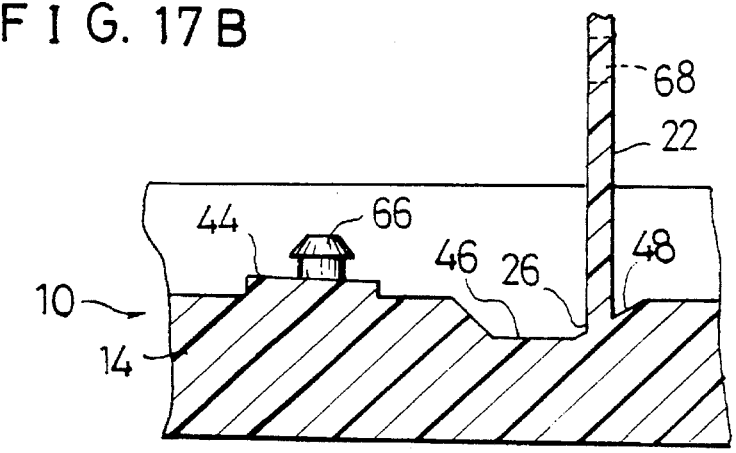
F I G. 17C
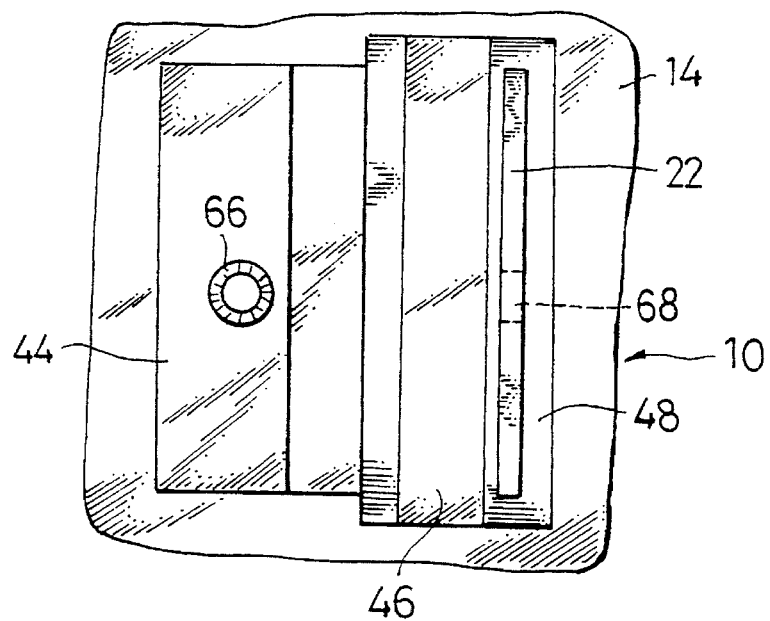

DISC CARTRIDGE

RELATED APPLICATIONS

This is a continuation-in-part application of U.S. patent application Ser. No. 07/901,380, filed Jun. 19, 1992 now U.S. Pat. No. 5,326,608.

BACKGROUND OF THE INVENTION

1. Field of the Invention

This invention relates to a disc cartridge, and more particularly to a disc cartridge wherein a disc-like medium such as a magnetic disc, a floppy disc, a hard disc, a cleaning disc, an optical disc, a magneto-optical disc or the like is rotatably received in a casing.

2. Description of the Prior Art

Conventionally, a disc cartridge is generally constructed in such a manner that a disc-like medium such as a floppy disc, a compact disc, a video disc or the like which is used for a digital data storing unit, a video equipment unit or the like is rotatably received in a casing to prevent adhesion of dust thereto and damage thereto. Also, the conventional disc cartridge, as shown in FIG. 1, is so constructed that the casing is provided on an inner surface thereof with an elastic lifter means 102 so as to exhibit an elastic force in a predetermined direction to pressedly contact sheet-like liners with the disc. In FIG. 1, the casing is designated by reference numeral 100.

In the conventional disc cartridge thus constructed, the lifter means 102 is formed and provided separate or independent from the casing 100. For example, the lifter means is formed by bending a part of a metal plate at a mounting portion of the inner surface of the casing or made of a film of a synthetic resin material such as PET (polyethylene terephthalate) or the like. The metal plate is fixed on the casing by caulking, while the PET film is fixed to the casing using a fixing means 104 such as a double-coated adhesive tape or the like.

Thus, the casing 100 and lifter means 102 are formed separate from each other, to thereby increase the number of parts of the disc cartridge and render assembling of the disc cartridge troublesome. Also, caulking or using of the fixing means 104 causes productivity of the disc cartridge to be highly deteriorated to incur an increase in manufacturing cost. Further, use of a metal plate for the lifter means of which a distal end exerts pressure on the disc leads to damage to the disc, in particularly, due to any possible burr produced on the metal plate, to thereby fail to provide the disc cartridge with satisfactory durability and reliability; whereas use of a synthetic resin such as PET for the lifter means leads to creep deformation of the lifter means sufficient to significantly decrease the pressing force of the lifter means acting on the disc, resulting in the disc being deformed.

SUMMARY OF THE INVENTION

The present invention has been made in view of the foregoing disadvantages of the prior art.

Accordingly, it is an object of the present invention to provide a disc cartridge which is capable of significantly reducing the number of parts for the disc cartridge and facilitating the assembling, to thereby substantially decrease the manufacturing cost.

It is another object of the present invention to provide a disc cartridge which is capable of permitting a pressing force acting on a rotating disc-like medium to be kept constant for a long period of time.

It is a further object of the present invention to provide a disc cartridge which is capable of effectively preventing damage to disc-like medium.

It is still another object of the present invention to provide a disc cartridge which is capable of substantially improving the durability and reliability.

It is yet another object of the present invention to provide a disc cartridge which is capable of accurately keeping a lifter means at a predetermined angle to ensure safety and smooth operation of a disc medium.

It is a still further object of the present invention to provide a disc cartridge which is capable of permitting the production efficiency to be highly increased.

In accordance with one aspect of the present invention a disc cartridge is provided. The disc cartridge includes a casing made of a synthetic resin material, a disc medium rotatably arranged in the casing, and a lifter means arranged on an inner surface of the casing so as to press the disc medium. The casing is formed on the inner surface thereof with a level different portion in a manner to be recessed from the inner surface of the casing and define a closed bottom beneath the lifter means. The lifter means is formed integrally with the casing and has a plate-like shape in such a manner that a proximal end thereof is connected to the level different portion of the inner surface of the casing and a distal end thereof is rendered free.

In a preferred embodiment of the present invention, the proximal end of the lifter means is formed with a thickness smaller than a free end thereof.

In a preferred embodiment of the present invention, the casing is provided on the inner surface thereof with an angle setting base means for holding the lifter means at predetermined angle and the lifter means is fixed on the angle setting base means while being kept inclined.

In a preferred embodiment of the present invention, the lifter means is formed at the proximal end thereof with a width smaller than that of a portion thereof pressed against the disc medium.

In accordance with another aspect of the present invention, a method for manufacturing a disc cartridge, which includes a casing made of a synthetic resin material, a disc medium rotatably arranged in the casing and a lifter means arranged on an inner surface of the casing in a manner to be integrally connected at a proximal end thereof to the casing so that the lifter means press the disc medium, is provided. The method comprises the step of forming the lifter means by means of a mold formed with a casing forming cavity and having an ejector pin attached thereto which ejector pin is formed on one side thereof with a lifter forming cavity for forming the lifter means in a manner to communicate with the casing forming cavity, to thereby form the lifter means integrally with the casing by injection molding.

BRIEF DESCRIPTION OF THE DRAWINGS

These and other objects and many of the attendant advantages of the present invention will be readily appreciated as the same becomes better understood by reference to the following detailed description when considered in connection with the accompanying drawing in which like reference numerals designate like or corresponding parts throughout; wherein:

FIG. 17A is an fragmentary sectional view showing a lifter in a modification of the disc cartridge shown in FIG. 14 while being fixed on an angle setting base means;

FIG. 17B is a fragmentary vertical sectional view of the lifter shown in FIG. 18A during formation of a casing;

FIG. 17C is a plan view of the lifter shown in FIG. 17B;

DETAILED DESCRIPTION OF THE PREFERRED EMBODIMENTS

Figure 1:
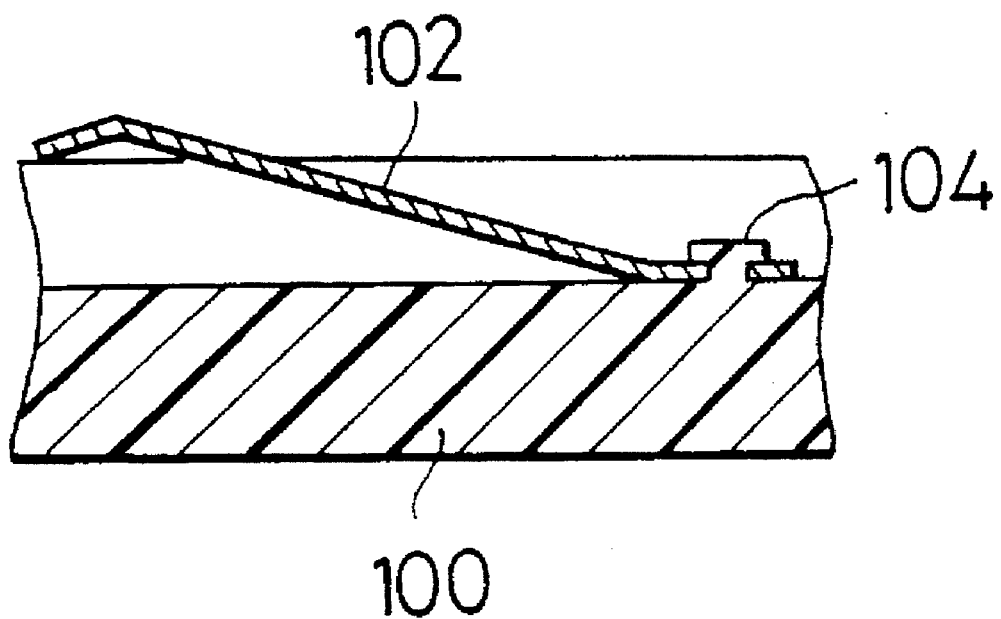
FIG. 1 is a fragmentary vertical sectional view showing a conventional lifter used in a disc cartridge.
Figure 2:
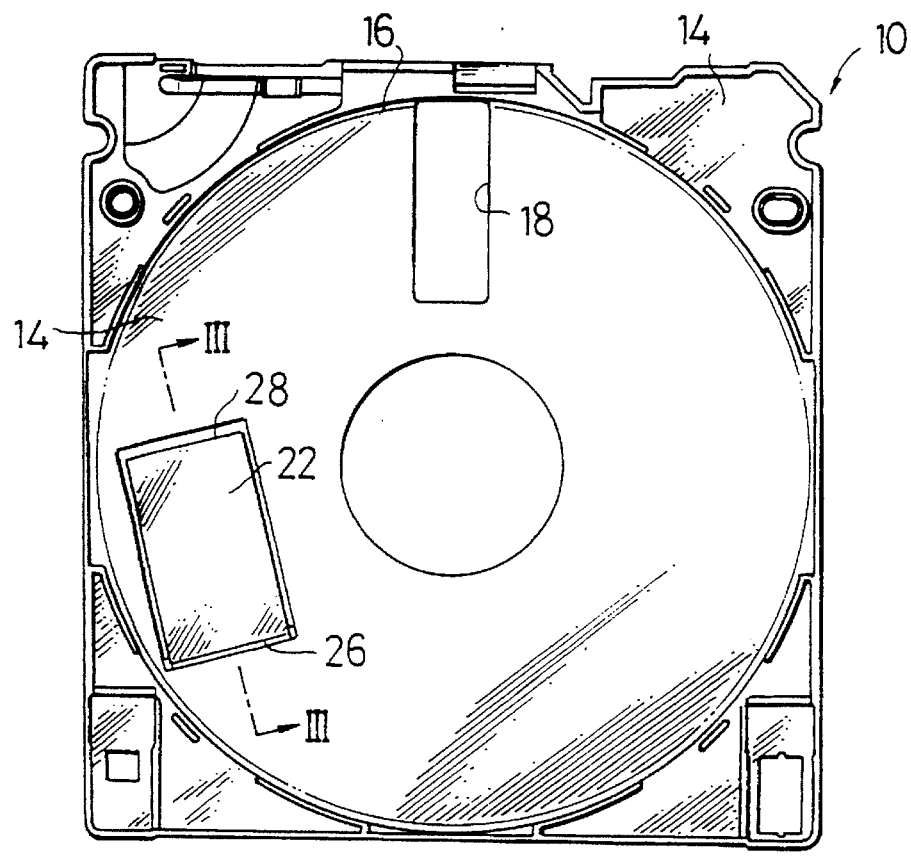
FIG. 2 is a plan view showing a first embodiment of a disc cartridge according to the present invention wherein an upper casing member of a casing is removed for clarifying an essential part of the disc cartridge.

Now, a disc cartridge according to the present invention will be described hereinafter with reference to FIGS. 2 to 6.

Referring first to FIGS. 2 to 6, a first embodiment of a disc cartridge according to the present invention is illustrated. A disc cartridge of the illustrated embodiment is constructed in the form of a floppy disc. However, it is a matter of course that the present invention is not limited to such a floppy disc.

The disc cartridge of the illustrated embodiment generally includes a casing 10 which includes an upper casing member 12 and a lower casing member 14 and a record medium or disc 16 rotatably received or arranged in the casing 10. The upper and lower casing members 12 and 14 of the casing 10 are each formed with an aperture 18 through which a head of a recording and/or reproducing unit is inserted into the disc cartridge when the disc cartridge is charged in the unit. The disc cartridge also includes a shutter 20 slidably mounted on the casing so as to selectively cover or close the apertures 18.

The disc cartridge of the illustrated embodiment generally constructed as described above includes a lifter means, which comprises a lifter 22 arranged on an inner surface of each of the upper and lower casing members 12 and 14 of the casing 10. The lifter 22 is formed so as to exert an elastic force in a predetermined direction, resulting in each of sheet-like liners 24 arranged between the disc 16 and the upper and lower casing members 12 and 14 being pressedly contacted with or biased against the disc 16.

The lifters 22 are each formed integrally with the casing 10. More particularly, when the casing 10 is formed of a synthetic resin material such as polypropylene or the like, the lifters 22 are each molded integrally with the casing member 12 or 14 and into a plate-like shape in such a manner that a proximal end 26 thereof is connected to the casing 10 and a distal end 28 thereof is rendered free.

The lifters 22 are each initially molded in a manner to vertically extend from the inner surface of the casing member 12 or 14 during formation of the casing 10 and then inclined or cantilevered at a predetermined inclination angle with respect to the inner surface of the casing 10 during post-forming thereof so that the distal or free end 28 of the lifter 22 is positioned in proximity to the inner surface of the casing 10. Such formation of the lifter 22 permits it to exhibit a pressing force of a predetermined magnitude for a long period of time without causing partial deformation or creep deformation of the disc 16.

Figure 3:
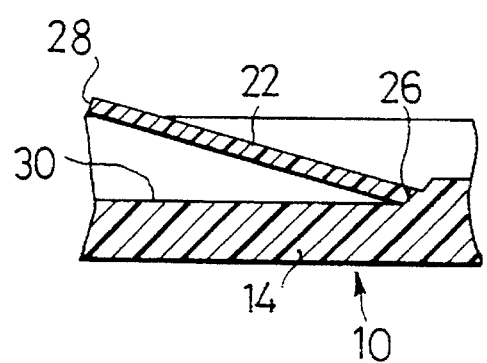
FIG. 3 is a fragmentary enlarged vertical sectional view taken along line III—III of FIG. 2.
Figure 4:
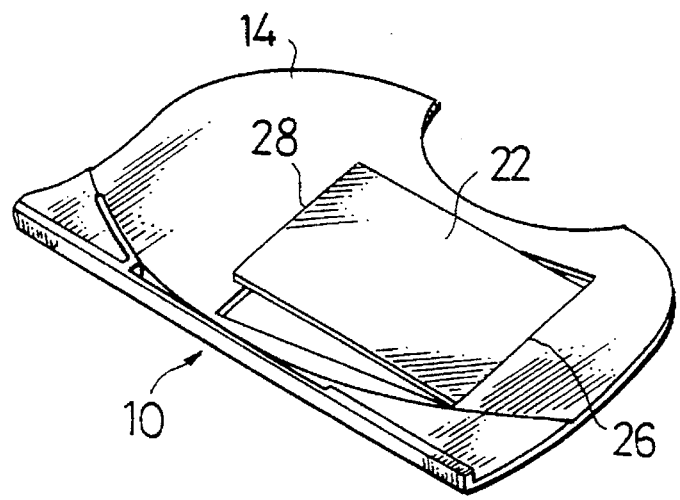
FIG. 4 is a fragmentary perspective view showing a lifter incorporated in the disc cartridge shown in FIG. 2.
Figure 5:
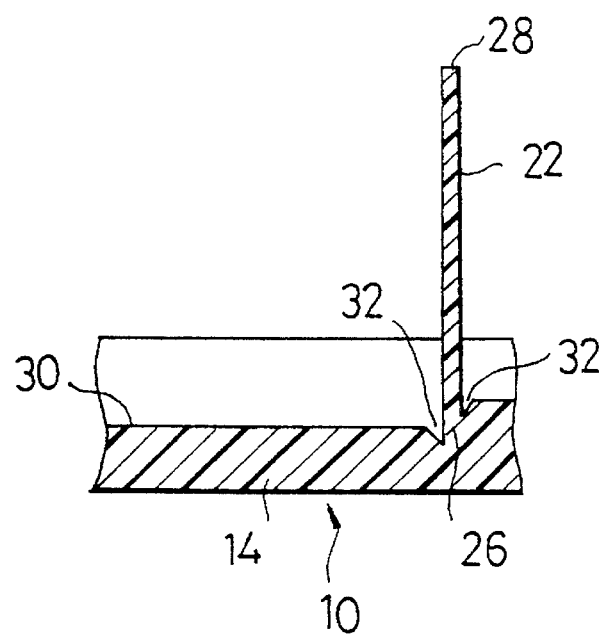
FIG. 5 is a fragmentary vertical sectional view of the lifter shown in FIG. 4 during formation of the casing.
Figure 6:
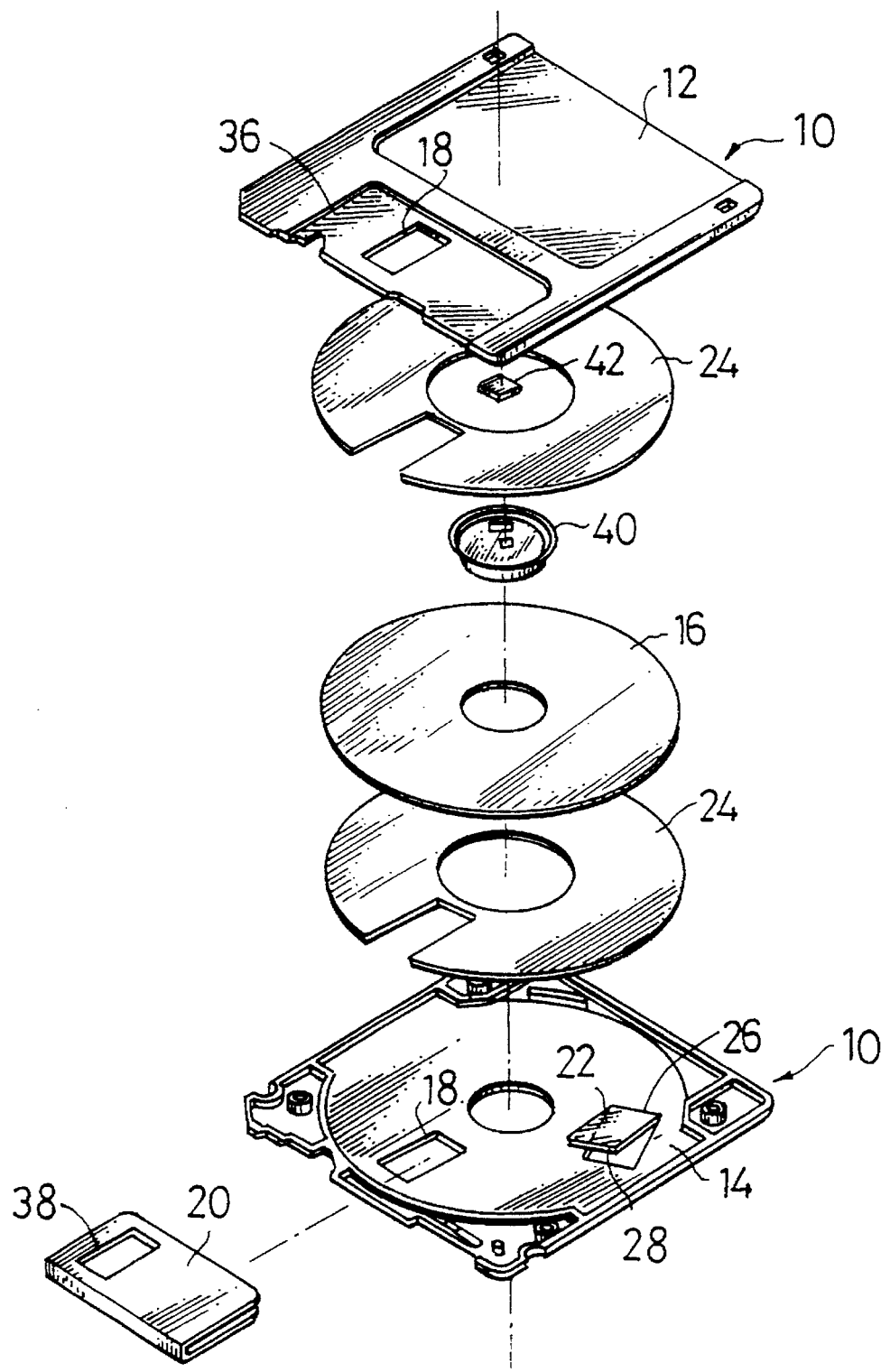
FIG. 6 is an exploded perspective view of the disc cartridge shown in FIG. 2.
Figure 7:
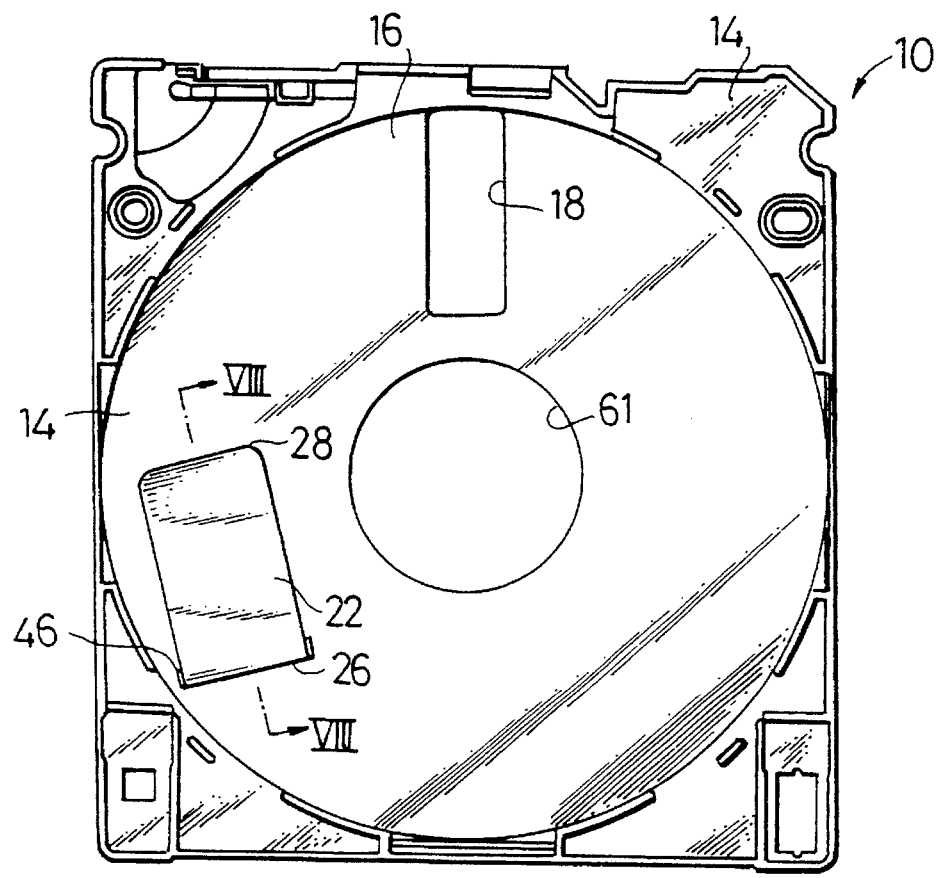
FIG. 7 is a plan view showing another embodiment of a disc cartridge according to the present invention wherein an upper casing member of a casing is removed for clarifying an essential part of the embodiment.

In the illustrated embodiment, it is preferable that the inner surface of the casing 10 is formed thereon with a level different portion 30 in a manner to be recessed from the inner surface of the casing 10 and the proximal end 26 of each of the lifters 22 is connected to the level different portion 30, as shown in FIGS. 3 and 5. Such construction of the lifter 22 facilitates the inclined arrangement of the lifter with respect to the inner surface of the casing 10 while still providing a closed bottom beneath the lifter.

Further, the proximal end 26 of each of the lifters 22, as shown in FIG. 5, is preferably formed on at least one of both sides thereof with a V-shaped groove 32 so as to extend approximately in a radial direction of the disc 16. The V-shaped groove 32 thus formed serves as an elastic hinge which permits the lifter 22 to be readily set at a predetermined inclination angle during the post-forming thereof. In the illustrated embodiment, the groove 32 is provided on each of both sides of the lifter 22, however, it may be provided on any one of both sides.

In the drawings, reference numeral 36 designates a recessed portion formed on an outer surface of each of the upper and lower casing members 12 and 14, which recessed portion serves as a slide area for the shutter 20. Reference numeral 38 designates a window formed in the shutter 20, 40 a hub, and 42 a a central plate.

In the disc cartridge of the illustrated embodiment constructed as described above, the disc 16 which is interposedly arranged between the liners 24 arranged in a pair is kept pressedly in contact with the liners for a long period of time by means of the substantially constant elastic force of the lifters 22. Thus, the illustrated embodiment minimizes or substantially prevents local or partial deformation of the disc and ensures the safety of the disc while preventing damage to the disc. Thus, the disc cartridge has significantly increased reliability.

As can be seen from the foregoing, in the disc cartridge of the illustrated embodiment, the elastic lifters which are arranged on the inner surface of the casing made of a synthetic resin material to exert an elastic force on the disc medium are each formed integrally with the casing and into a plate-like shape in such a manner that the proximal end thereof is connected to the casing and the distal end thereof is rendered free. Such construction of the illustrated embodiment significantly decreases the number of parts, facilitates assembling of the disc cartridge and attains a decrease in manufacturing cost. Also, the illustrated embodiment permits the pressing force exerted on the rotating disc medium to be kept constant for a long period of time and effectively prevents damage to the disc-like medium, to thereby substantially improve durability and reliability of the disc cartridge. This also prevents disc cleaning and touch of a head with respect to the disc from being deteriorated. Moreover, the illustrated embodiment substantially prevents deformation of the disc medium which causes damage thereto, and facilitates manufacturing.

Figure 8:
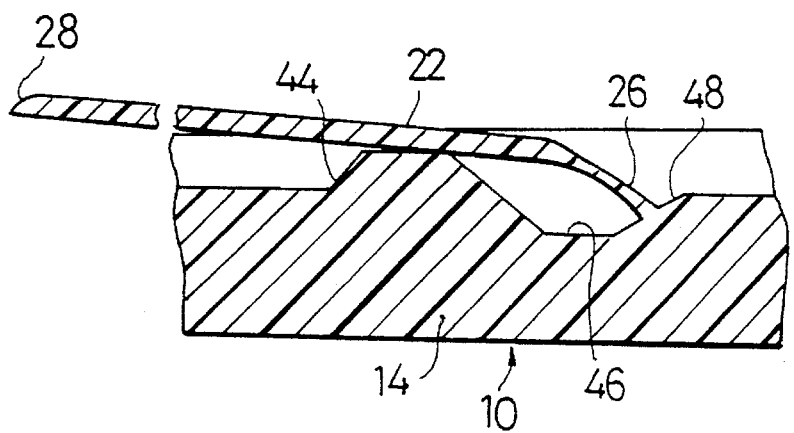
FIG. 8 is an enlarged vertical sectional view taken along line VIII—VIII of FIG. 7.
Figure 9:
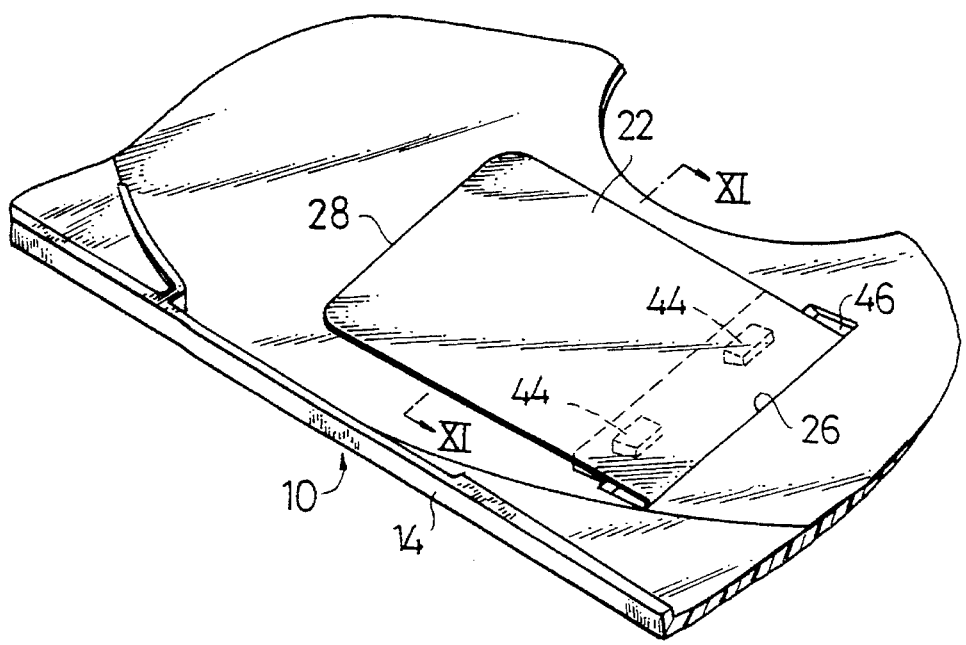
FIG. 9 is a fragmentary perspective view showing a lifter incorporated in the disc cartridge shown in FIG. 7.

Referring now to FIGS. 7 to 11, another or a second embodiment of a disc cartridge according to the present invention is illustrated. In a disc cartridge of the illustrated embodiment, a lifter 22 which is formed into a plate-like shape so as to act as a lifter means is arranged on an inner surface of each of upper and lower casing members 12 and 14 in a manner to vertically extend therefrom. Also, the upper and lower casing members 12 and 14 are each provided on the inner surface thereof with an angle setting base means 44 so as to be adjacent to the lifter 22. In the illustrated embodiment, each of the angle setting base means 44 comprises two angle setting base elements arranged in juxtaposition to each other for each of the lifters 22, as shown in FIG. 9. The lifters 22 are each integrally connected at a proximal end 26 thereof to the casing member and the angle setting base means 44 each function to hold the lifter 22 at a predetermined oblique angle to permit a free or distal end 28 of the lifter 22 to exert pressure on a disc-like medium 16.

Figure 10:
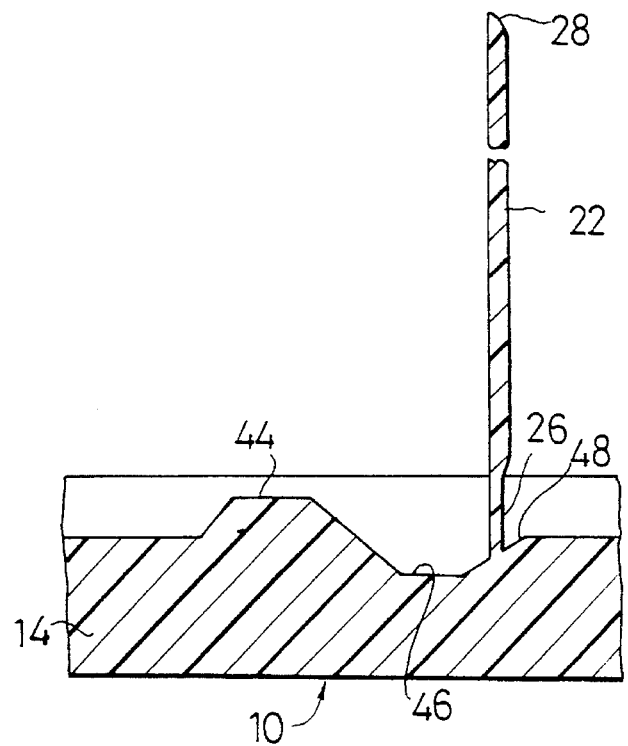
FIG. 10 is a fragmentary vertical sectional view of the lifter shown in FIG. 9 during formation of the casing.

Also, in the illustrated embodiment, the lifter 22 is formed in such a manner that the proximal end 26 is formed with a thickness smaller than that of the distal or free end 28, as shown in FIGS. 8 and 10, to thereby facilitate bending of the lifter 22 at the proximal end 26 and permit a pressing force of the lifter 22 against the disc 16 to be readily kept constant.

For this purpose, the lifter 22 is arranged on the inner surface of each of the upper and lower casing members 12 and 14 so as to inwardly vertically extend therefrom as described above. Then, the lifter 22 is bent at the proximal end 26 thereof and fixedly held on the angle setting base means 44, to thereby be inclined at a predetermined angle with respect to the inner surface of the casing member so that the distal or free end 28 of the lifter 22 is positioned in proximity to the inner surface of the casing member. Such formation of the lifter 22 permits it to exert the pressing force of a predetermined magnitude for an increased period of time without causing partial deformation or creep deformation of the disc 16.

Dimensions and arrangement of the angle setting base means 44 are determined so as to keep the free end 28 of the lifter 22 spaced therefrom, to thereby prevent a portion of the lifter positioned on the base 44 from pressing the disc.

Figure 11:
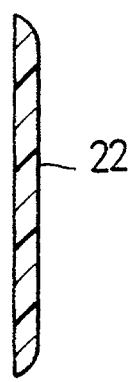
FIG. 11 is a sectional view taken along line XI—XI of FIG. 9.

The lifter 22 is chamfered or rounded at edges of a surface thereof facing or pressed against the disc 16 as shown in FIGS. 10 and 11, resulting in any possible burr or the like being removed, so that a recording surface of the disc 16 may be effectively prevented from being damaged.

In the illustrated embodiment, it is preferable that the upper and lower casing members 12 and 14 are each provided on the inner surface thereof with a recess 46, which is enlarged toward an opening thereof so as to have an oblique side surface 48 diverging from a bottom of the recess 46, and the lifter 22 is connected at the proximal end thereof to the oblique side surface 48 of the recess 46 so as to vertically extend therefrom as shown in FIG. 10. Such construction further facilitates bending of the lifter 22.

The remaining part of the second embodiment may be constructed in substantially the same manner as the above-described first embodiment.

Figure 13:
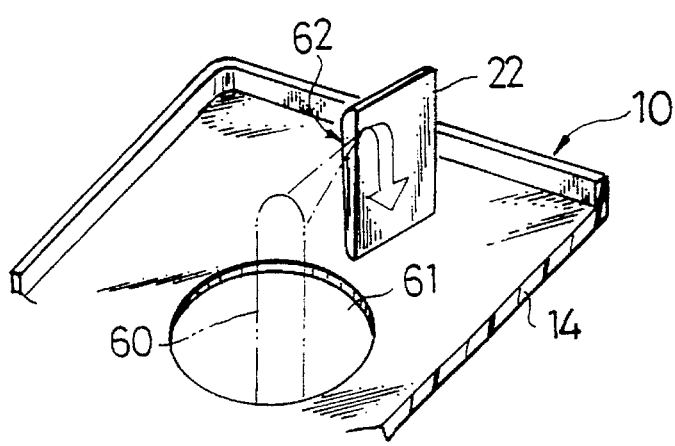
FIG. 13 is a fragmentary schematic perspective view showing one example of formation of a lifter in the disc cartridge of FIG. 7.
Figure 12:
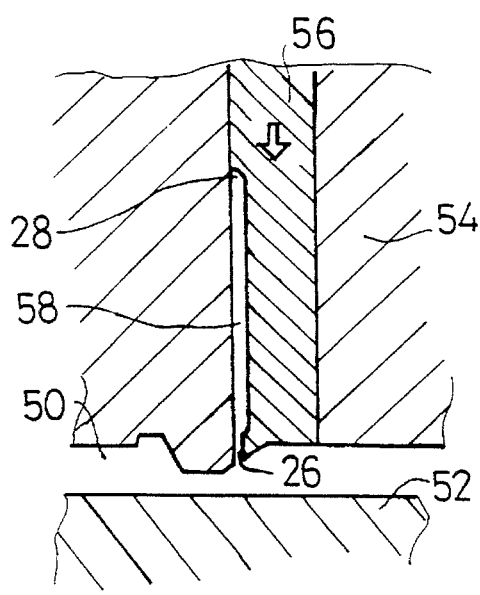
FIG. 12 is a fragmentary sectional view showing one example of arrangement of a mold for manufacturing of the casing of the disc cartridge shown in FIG. 7.

Now, one example of manufacturing of the disc cartridge of the second embodiment will be exemplified with reference to FIGS. 12 and 13.

The casing members 12 and 14 are each molded by injecting resin into a casing forming cavity 50 defined in a mold constructed of a stationary mold plate 52 and a movable mold plate 54, as shown in FIG. 12. The mold is attached thereto an ejector pin 56 for ejecting the thus formed casing member from the mold. The ejector pin 56 is formed into a polygonal shape in section such as a rectangle or the like and formed on one of side surfaces thereof with a lifter forming cavity 58 so as to communicate with the casing forming cavity 50 of the mold, so that the lifter 22 is concurrently molded integrally with the casing member during formation of the casing member. The lifter forming cavity 58 is formed at a portion thereof for forming the proximal end 26 of the lifter 22 into a decreased depth as shown in FIG. 12, resulting in the proximal end 26 being formed with a thickness smaller than the remaining part of the lifter 22.

Also, the lifter forming cavity 58 is arranged at the ejector pin 56 so as to face a side on which the lifter 22 is bent. Such arrangement of the lifter forming cavity 58 effectively prevents any burr from being formed on the above-described surface of the lifter 22 which is pressed against the disc-like medium 16, to thereby eliminate a necessity of subjecting the surface to a surface smoothing treatment. Also, the lifter forming cavity 58 is preferably rounded at corners thereof.

Further, the casing forming cavity 50 for forming the casing member is provided with three or four gates through which a resin material for the casing member is introduced into the cavity 50. However, irrespective of such arrangement of the gates, the resin material fails to satisfactorily enter the lifter forming cavity 58. In order to avoid the problem, the illustrated embodiment, as shown in FIG. 13, may be so constructed that a runner 60 independent from a runner (not shown) for forming the casing member is provided in a manner to extend through an opening of a drive shaft inserting hole 61 or the like. Such construction permits the lifter 22 to be directly injection-molded together with the casing member while keeping the runner 60 and a gate 62 formed at the lifter forming cavity 58 connected to each other.

As described above, the second embodiment is so constructed that the ejector pin attached to the mold for forming the casing member is formed on one side thereof with the lifter forming cavity to permit the lifter to be formed concurrently and integrally with the casing member. Thus, it will be noted that the second embodiment exhibits, in addition to the advantages of the above-described first embodiment, an advantage of facilitating manufacturing of the mold to improve the productivity. Also, arrangement of the lifter forming cavity at the ejector pin in a manner to face a side on which the lifter is bent as described above prevents any possible burr from being formed on the surface of the lifter which is pressed against the disc, to thereby eliminate a necessity of post-processing for removing the burr from the lifter. Moreover, arrangement of the gate at the lifter forming cavity described above for the purpose of introducing resin into the cavity results in resin positively entering the lifter forming cavity to accomplish satisfactory formation of the lifter of a decreased thickness.

Figure 14:
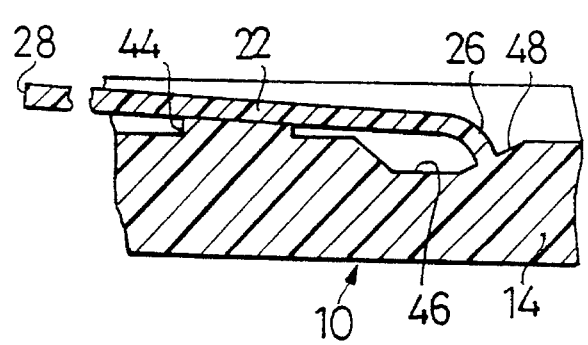
FIG. 14 is a fragmentary sectional view showing an essential part of a further embodiment of a disc cartridge according to the present invention.

Referring now to FIGS. 14 to 18C, a further or third embodiment of a disc cartridge according to the present invention is illustrated. In the third embodiment, a lifter 22 is fixedly fused on an angle setting base means 44 by ultrasonic welding or the like. The disc cartridge of the third embodiment is so constructed that upper and lower casing members of a casing 10 are each formed on an inner surface thereof with such a level different portion as indicated at reference numeral 30 in FIG. 3 described above or a recess 46 enlarged toward an opening thereof as shown in FIG. 14, and lifters 22 are each connected at a proximal end 26 thereof to the level different portion or on an oblique side surface 48 of the recess 46 as shown in FIG. 14. Such construction of the lifter 22 facilitates bending of the lifter 22 carried out for fixing the lifter on the angle setting base means 44 by fusion. Also, the proximal end 26 of each of the lifters 22 may be formed on at least one of both sides thereof with a V-shaped groove serving as an elastic hinge which permits the lifter 22 to be readily set at a predetermined inclination angle in the post-forming as in the first embodiment described above. In the illustrated embodiment, the angle setting base means 44 for each of the upper and lower casing members comprises two angle setting base elements arranged in juxtaposition to each other in a direction perpendicular to a longitudinal direction of each of the lifters and spaced from each other at a predetermined interval as in the second embodiment described above.

The angle setting base means 44 is formed thereon with a lifter holding surface for holding the lifter 22 thereon. The lifter holding surface, when the lifter 22 is formed with a length of 10 mm between the proximal end 26 thereof and a distal end 28 thereof and a thickness of 0.25 mm, may be formed so as to have an inclination angle of 1 to 3 degrees. An angle of the angle setting base means 44 which is suitable to permit the distal end 28 of the lifter 22 to be lightly in contact with a liner 24 is determined in view of other dimensions and dimensional relationships as well. In particular, the angle is so determined that displacement of the distal or free end 28 of the lifter 22 results in the lifter appropriately exerting pressure on a disc 16 through the liner 24, to thereby permit the lifter to exert a constant pressing force against the disc for a long period of time to a degree sufficient to accommodate to a variation of the disc 16.

Figure 15:
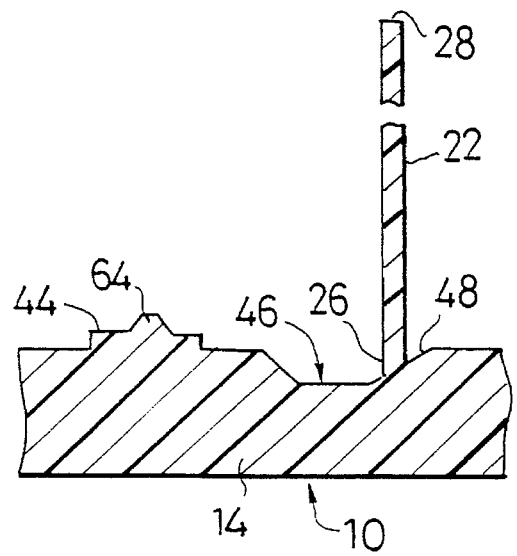
FIG. 15 is a fragmentary vertical sectional view showing a lifter in the disc cartridge of FIG. 14 during formation of a casing.
Figure 16:
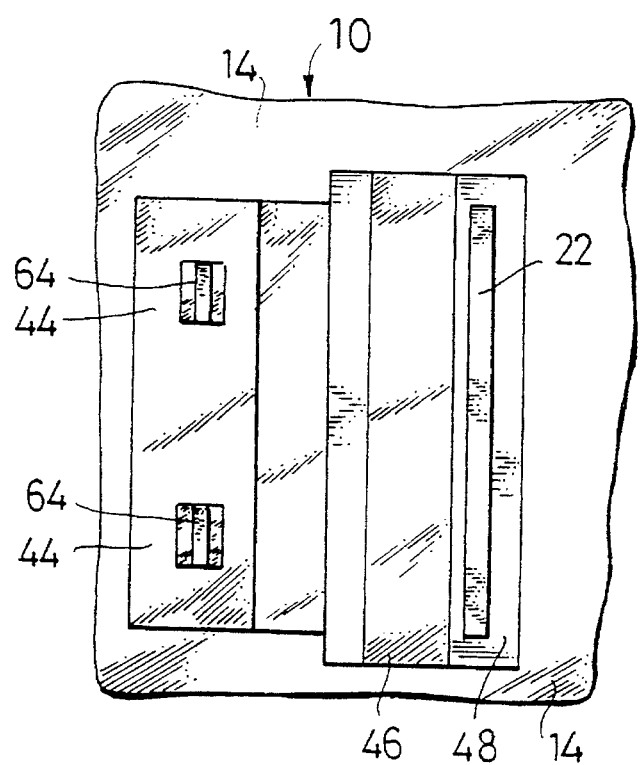
FIG. 16 is a fragmentary plan view of the lifter shown in FIG. 15.
Figure 18A:
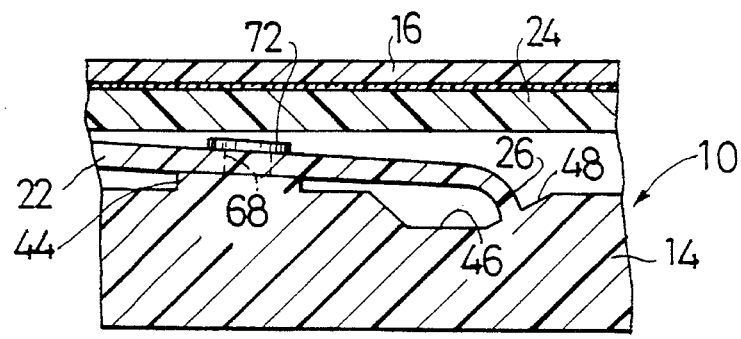
FIG. 18A is an fragmentary sectional view showing a lifter in another modification of the disc cartridge of FIG. 14 while being fixed on an angle setting base means.
Figure 18B:
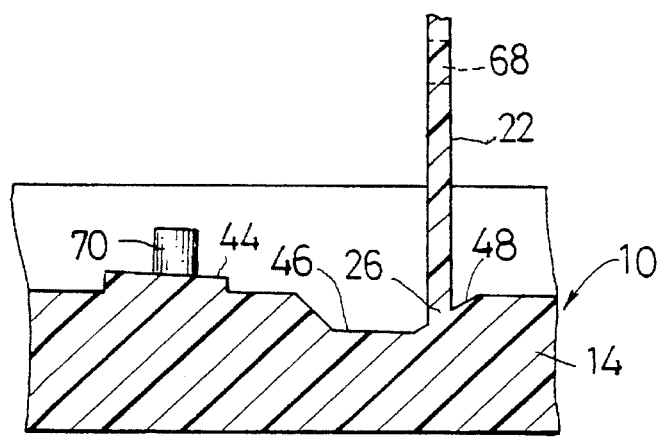
FIG. 18B is a fragmentary vertical sectional view of the lifter shown in FIG. 18A during formation of a casing.
Figure 18C:
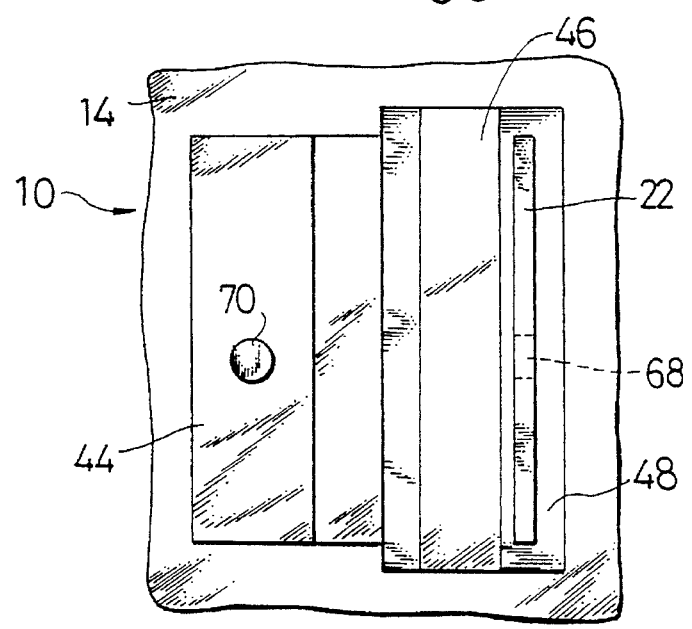
FIG. 18C is a plan view of the lifter shown in FIG. 18B.
Figure 19:
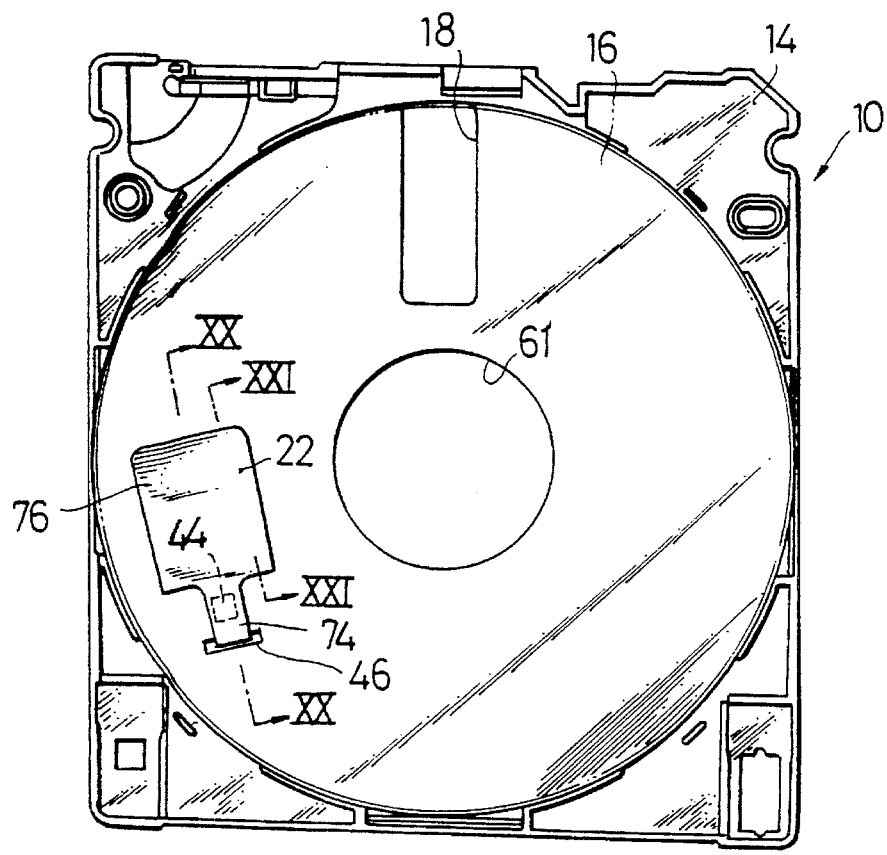
FIG. 19 is a plan view showing still another embodiment of a disc cartridge according to the present invention.

Also, the angle setting base means 44 is preferably provided thereon with a welding rib 64 in a manner to outwardly project therefrom during formation of the casing 10, as shown in FIGS. 15 and 16, which rib 64 is then melted for fixing of the lifter 22 onto the angle setting base means 44 by fusion as shown in FIG. 14. In the illustrated embodiment, two such welding ribs 64 which are formed into a trapezoid shape in section are provided. However, a plurality of such ribs 64 or a single wide rib extending parallel to the proximal end 26 of the lifter 22 may be arranged. Also, the rib may be formed at a distal end thereof into a saw-like shape, to thereby facilitate melting of the rib.

The remaining part of the third embodiment may be constructed in substantially the same manner as the second embodiment described above.

FIGS. 17A to 17C show a modification of the third embodiment described above with reference to FIGS. 14 to 16. In the modification, an angle setting base means 44 is provided thereon with a joggle-like projection 66 and correspondingly a lifter 22 is formed with a hole 68 adapted to be engagedly fitted on the projection 66, so that the lifter 22 may be fixed on the angle setting base means 44 through press-fitting between the projection 66 and the hole 68. In another modification shown in FIGS. 18A to 18C, an angle setting base means 44 is provided thereon with a projection 70 and correspondingly a lifter 22 is formed with a hole 68 adapted to be engagedly fitted on the projection 70. After fitted engagement between the projection 70 and the hole 68, the projection 70 is subjected to caulking to form a flange 72, resulting in the lifter 22 being fixed on the angle setting means 44.

Thus, the third embodiment shown in FIGS. 14 to 18C is so constructed that the angle setting base means is arranged so as to securely hold thereon the lifter at a predetermined inclination angle. Such construction significantly decreases the number of parts for the disc cartridge, facilitates assembling of the disc cartridge and attains a decrease in manufacturing cost, as well as accomplishes holding of the lifter at a predetermined angle with high accuracy. Also, the embodiment permits the pressing force exerting on the rotating disc medium to be kept constant for an increased period of time and effectively prevents damage to the disc-like medium, to thereby substantially improve durability and reliability of the disc cartridge. This also prevents disc cleaning and touch of a head with respect to the disc from being deteriorated. Moreover, the embodiment substantially prevents deformation of the disc medium which causes damage thereto, and facilitates manufacturing.

Referring now to FIG. 19 to 25, a fourth embodiment of a disc cartridge according to the present invention is illustrated, which is constructed so as to improve the second embodiment described above with reference to 7 to 13. As described above, the second embodiment is so constructed that the lifter means is formed integrally with the casing and formed at the proximal end thereof with a thickness smaller than that of the portion thereof pressed against the disc, resulting in the pressing force of the lifter means against the disc medium being adjusted depending on a thickness of the lifter means and the like. It was found that the pressing force of the lifter means against the disc medium is proportional to a cube of a thickness of the lifter means, so that even a slight variation in thickness of the lifter means substantially affects the pressing force. Thus, it is required to carry out formation of the casing with high dimensional accuracy. Unfortunately, this causes efficiency in disc formation to be highly deteriorated. The fourth embodiment is constructed so as to improve efficiency in disc formation.

More particularly, a lower casing member 14 is formed on an inner surface thereof with a recess 46 enlarged toward an opening thereof so as to provide an oblique side surface 48 diverging from a bottom of the recess 46 and an angle setting base means 44 in a manner to be in proximity to each other. A lifter means 22 is integrally connected to a portion of the side surface 48 of the recess 46 opposite to the angle setting base means 44. In the illustrated embodiment, the angle setting base means 44 comprises a single angle setting base element and the lifter means 22 comprises a single lifter. The angle setting base means 44 is formed with a predetermined height which provides the lifter means 22 with such an inclination angle as described hereinafter. The recess 46 functions to facilitate bending of the lifter means 22.

An upper casing member may be constructed in a conventional manner. Alternatively, it may be constructed in such a manner as any one of the first to third embodiments described above or in the same manner as the lower casing member 14.

Figure 20:
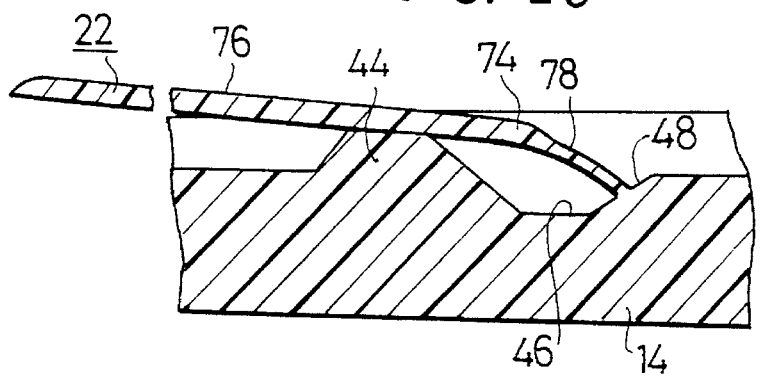
FIG. 20 is an enlarged sectional view taken along line XX—XX of FIG. 19.
Figure 21:
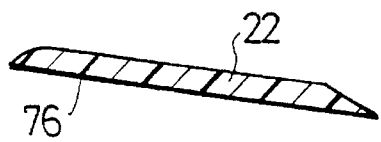
FIG. 21 is an enlarged sectional view taken along line XXI—XXI of FIG. 19.
Figure 22:
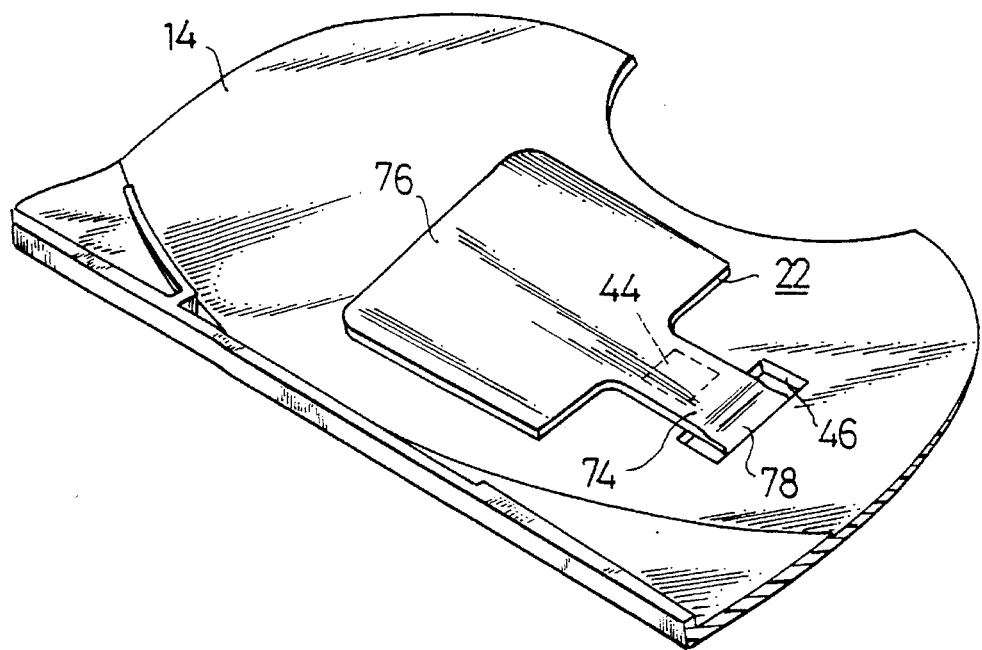
FIG. 22 is a fragmentary enlarged perspective view of a lifter in the disc cartridge shown in FIG. 19.
Figure 23:
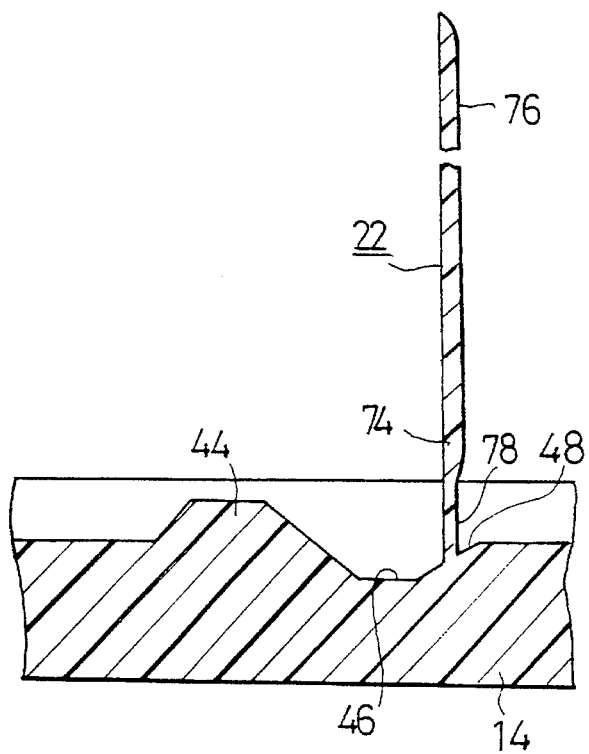
FIG. 23 is a fragmentary sectional view of the lifter shown in FIG. 22 during formation of a lower casing member.

The lifter 22, as shown in FIGS. 20 to 22, is formed into a substantially plate-like T-shape. More particularly, it is formed at a proximal end thereof connected to the inner surface of the lower casing member 14 with a reduced width section 74 and on a side of a distal or free end thereof with a pressing section 76 of an increased width. The reduced width section 74, as shown in FIGS. 20, 22 and 23, is formed at a proximal end thereof with a thin-walled portion 78 having a thickness reduced as compared with the remaining part of the section 74, to thereby further facilitate bending of the lifter 22. The thin-walled portion 78 is tapered. More specifically, it is formed so as to be gradually increased in thickness from a proximal end thereof to a distal end thereof. Also, as shown in FIG. 21, the pressing section 76 is chamfered or rounded at an edge portion of a distal end thereof and tapered at a proximal end thereof to improve release of an edge of the proximal end from a mold. The lifter 22 thus constructed is bent at a predetermined inclination angle onto the angle setting base means 44, so that the reduced width section 74 is abutted against the angle setting base means 44 and the pressing section 76 is pressed against a disc medium through a sheet-like liner (not shown).

In the fourth embodiment, the lifter 22 for elastically pressing the liner against the disc medium 16 is formed with the reduced width section 74 which is decreased in both width and thickness, so that a pressing force of the lifter 22 is substantially affected by flexural rigidity of the reduced width section 74, resulting in the pressing force being adjusted by varying the flexural rigidity. Flexural rigidity of the reduced width section 74 is proportional to a cube of a thickness of the section 74 and a width thereof. In the embodiment, a decrease in width of the lifter due to the reduced width section minimizes an effect of some variation in thickness on the flexural rigidity. Thus, the lower casing member 14 is formed without requiring high accuracy, to thereby improve production efficiency.

More particularly, the lower casing member 14 is formed integrally with the lifter 22 while keeping it vertical as shown in FIG. 23 by means of a cavity formed in an ejector pin for ejecting the lower casing member from a mold as in the second embodiment described above, which lifter is then bent onto the angle setting base means 44. During formation of the lifter 22, the thin-walled portion 78 of the lifter 22 constitutes an undercut as shown in FIG. 23, so that release of the lifter from the cavity requires to move the ejector pin horizontally or in a lateral direction in FIG. 23, resulting in rendering strict dimensional adjustment difficult to lead to a variation in thickness of the lifter. The fourth embodiment effectively eliminates such a disadvantage. More particularly, the embodiment, as described above, is constructed so as to prevent some variation in thickness of the reduced width section 74 from affecting the pressing force of the lifter, to thereby prevent occurrence of defective products, leading to an increase production efficiency.

Further, in the disc cartridge of the fourth embodiment, the upper edge of the thin-walled portion 78 constituting an undercut and the lower edge of the pressing section 76 are tapered as described above, so that horizontal movement of the ejector pin or release of the lifter from the cavity may be smoothly accomplished.

Figure 24:
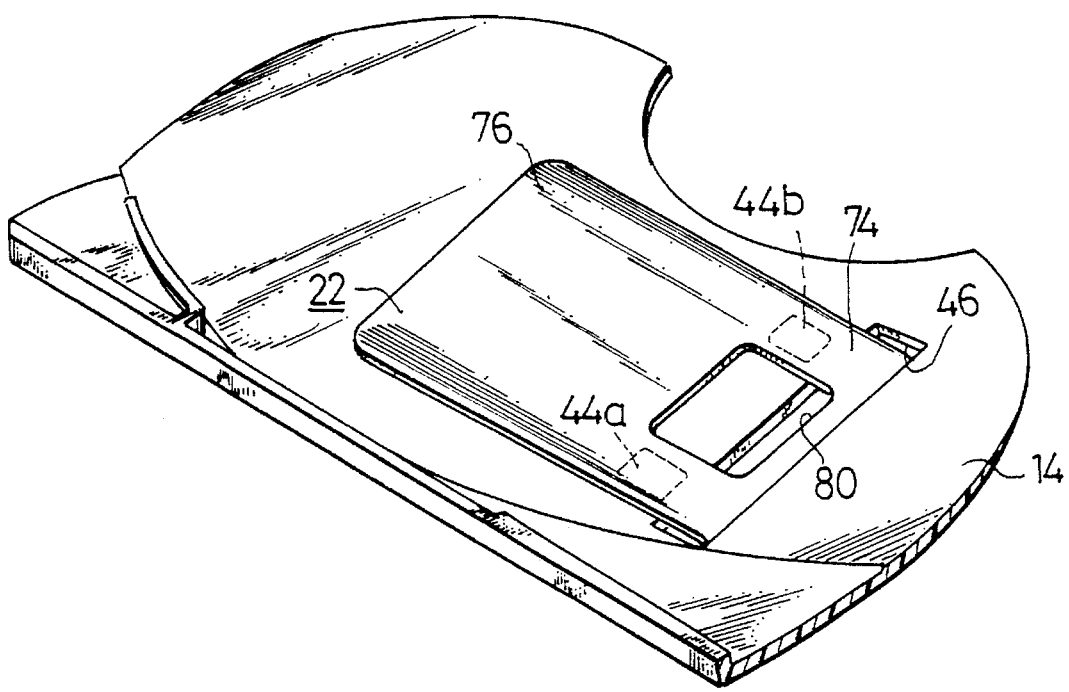
FIG. 24 is a fragmentary perspective view showing a lifter in a modification of the disc cartridge shown in FIG. 19.

FIG. 24 shows a modification of the fourth embodiment described above, in which a lifter 22 is formed at a proximal end thereof with a window 80 to substantially reduce a width of the proximal end of the lifter 22, to thereby provide a reduced width section 74. Also, a lower casing member 14 is formed on an inner surface thereof with an angle setting base means comprising two angle setting base elements 44a and 44b arranged so as to interpose the window 77 therebetween.

Figure 25:
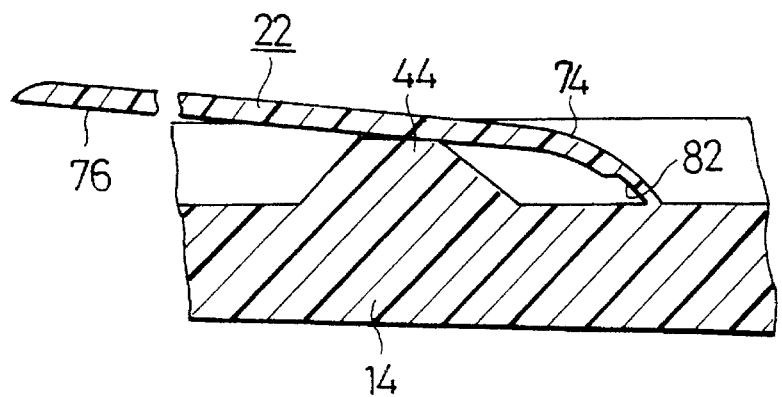
FIG. 25 is an enlarged sectional view showing a lifter in another modification of the disc cartridge shown in FIG. 19.

FIG. 25 shows another modification of the fourth embodiment, wherein a lifter 22 is formed on a flat inner surface of a lower casing member 14 without forming thereon any recess such as the recess 46 in the fourth embodiment described above. Instead, the lifter 22 is formed on a side of a proximal end thereof on which the lifter is bent with a recessed groove 82 so as to extend in parallel to the inner surface of the lower casing member 14.

The remaining part of each of the modifications shown in FIGS. 24 and 25 may be constructed in substantially the same manner as the fourth embodiment.

As can be seen from the foregoing, in the fourth embodiment, the lifter formed integrally with the casing is formed at the proximal end thereof into a reduced width, resulting in production efficiency being improved without requiring high dimensional accuracy.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:

a casing made of a synthetic resin material;

a disc medium rotatably arranged in said casing; and a lifter means having a plate-like shape arranged on an inner surface of said casing so as to press said disc medium;

said casing being formed on said inner surface thereof with a level different portion in a manner to be recessed from said inner surface of said casing and defining a closed bottom beneath said lifter means;

said lifter means and said closed bottom being formed integrally with said casing by molding in such a manner that a proximal end of said lifter means is connected to said level different portion of said inner surface of said casing and a distal end thereof is rendered free, the lifter means extends vertically from said inner surface and is inclined at a predetermined angle with respect to said inner surface of said casing so as to permit said distal end of said lifter means to be positioned in proximity to said inner surface of said casing.

2. A disc cartridge as defined in claim 1, wherein said casing is provided on said inner surface thereof with an angle setting base means for holding said lifter means at a predetermined inclination angle;

said lifter means being fixed on said angle setting base means while being kept inclined.

3. A disc cartridge as defined in claim 2, wherein said angle setting base means is formed thereon with a lifter holding surface for holding said lifter means thereon, said lifter holding surface having an inclination angle of 1 to 3 degrees.

4. A disc cartridge as defined in claim 2, wherein said angle setting base means is provided thereon with a lifter fixing means for fixing said lifter means on said angle setting base means.

5. A disc cartridge as defined in claim 4, wherein said lifter fixing means comprises a welding rib.

6. A disc cartridge as defined in claim 4, wherein said lifter fixing means comprises an projection engaged with a hole formed in said lifter means.

7. A disc cartridge as defined in claim 2, wherein said lifter means is formed at said proximal end thereof with a width smaller than that of a portion thereof pressed against said disc medium.

8. A disc cartridge as defined in claim 1, wherein said lifter means is formed at said proximal end thereof with a width smaller than that of a portion thereof pressed against said disc medium.

9. A disc cartridge as defined in claim 8, wherein said lifter means is formed at said proximal end thereof with a window.

10. A disc cartridge as defined in claim 1, wherein said casing and lifter means are formed of a polypropylene resin material.

11. A disc cartridge comprising:

a casing made of a synthetic resin material;

a disc medium rotatably arranged in said casing; and a lifter means arranged on an inner surface of said casing so as to press said disc medium;

said casing being formed on said inner surface thereof with a level different portion in a manner to be recessed from said inner surface of said casing and defining a closed bottom beneath said lifter means;

said lifter means being formed integrally with said casing and having a plate-like shape in such a manner that a proximal end thereof is connected to said level different portion of said inner surface of said casing and a distal end thereof is rendered free, wherein said proximal end of said lifter means is formed with a thickness smaller than said distal end thereof.

12. A disc cartridge as defined in claim 11, wherein said lifter means is chamfered at edges of a surface thereof pressed against said disc medium.

13. A disc cartridge as defined in claim 12, wherein said level different portion of said inner surface of said casing defines a recess enlarged toward an opening thereof so as to have an inclined side surface diverging from said closed bottom;

said lifter means being connected to said inclined side surface of said recess so as to vertically extend therefrom.

14. A disc cartridge as defined in claim 11, wherein said level different portion of said inner surface of said casing defines a recess enlarged toward an opening thereof so as to have an inclined side surface diverging from said closed bottom;

said lifter means being connected to said inclined side surface of said recess so as to vertically extend therefrom.

15. A disc cartridge as defined in claim 14, wherein said casing is provided on said inner surface thereof with an angle setting base means for holding said lifter means at a predetermined inclination angle;

said lifter means being fixed on said angle setting base means while being kept inclined.

16. A disc cartridge as defined in claim 14, wherein said lifter means is formed at said proximal end thereof with a width smaller than that of a portion thereof pressed against said disc medium.

17. A disc cartridge as defined in claim 11, wherein said lifter means is formed at said proximal end thereof with a width smaller than that of a portion thereof pressed against said disc medium.

18. A disc cartridge housing for rotatably supporting a disc medium comprising:

a casing made of a synthetic resin material and configured to rotatably support the disc medium; and a biasing means, integrally formed with the casing, for pressing the disc medium when installed in the casing, the biasing means including a lifter member integrally connected to the casing during molding at a proximal end and having a distal end cantilevered from the casing and bent during a postmolding procedure to provide an elastic hinge, the biasing means further including an integral base member extending from the casing at a height above the connection of the casing to the distal end of the lifter member for fixedly supporting an intermediate portion of the lifter member, wherein the proximal end of the lifter member is formed with a thickness smaller than the cantilevered distal end thereof, and the proximal end of the lifter member extending beyond the base member can provide a pressing force for application to the disc medium.

19. A disc cartridge comprising:

a casing made of a synthetic resin material;

a disc medium rotatably arranged in said casing; and a lifter means arranged on an inner surface of said casing so as to press said disc medium;

said casing being formed on said inner surface thereof with a level different portion in a manner to be recessed from said inner surface of said casing and defining a closed bottom beneath said lifter means, wherein said level different portion of said inner surface of said casing defines a recess enlarged toward an opening thereof so as to have an inclined side surface diverging from said closed bottom, said lifter means being formed integrally with said casing and having a plate-like shape in such a manner that a proximal end thereof is connected to said level different portion of said inner surface of said casing and a distal end thereof is rendered free; and an angle setting base means, on said casing, for holding said lifter means at a predetermined inclination angle, said lifter means being fixed on said angle setting base means while being kept inclined, said angle base comprises a projection engaged with a hole formed in said lifter means.

* * * * *